United States Patent
Konishi et al.

(10) Patent No.: US 7,564,168 B2
(45) Date of Patent: Jul. 21, 2009

(54) DRIVING DEVICE (75) Inventors: Hirotoshi Konishi, Toyokawa (JP);
Hiroyoshi Hosota, Toyokawa (JP);
Akira Wada, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 395 days.

(21) Appl. No.: 11/390,938

(22) Filed: Mar. 28, 2006

(65) Prior Publication Data
US 2006/0232168 A1 Oct. 19, 2006

(30) Foreign Application Priority Data
Mar. 30, 2005 (JP) ............... 2005-096917
Feb. 6, 2006 (JP) ............... 2006-028678

(51) Int. Cl.
*H02N 2/00* (2006.01)
*H01L 41/08* (2006.01)
(52) U.S. Cl. ............... 310/323.09; 310/12; 310/323.17
(58) Field of Classification Search ............... 310/12, 310/323.01–323.19, 328
See application file for complete search history.

(56) References Cited

U.S. PATENT DOCUMENTS 5,589,723 A 12/1996 Yoshida et al.
6,040,643 A * 3/2000 Bruns ............... 310/26
7,315,108 B2 * 1/2008 Okamoto et al. ....... 310/323.17
2007/0176514 A1 * 8/2007 Lei et al. ............... 310/328
2007/0228884 A1 * 10/2007 Manabe ............... 310/328

FOREIGN PATENT DOCUMENTS

JP 8-70586 12/1996

OTHER PUBLICATIONS

Figs. 1 and 2 from attached new U.S. Patent Application claiming benefit of Japanese Application Nos. 2005-096917 filed Mar. 30, 2005 and 2006-028678 filed Feb. 2, 2006, 2 pages.

* cited by examiner

*Primary Examiner*—Thomas M Dougherty
(74) *Attorney, Agent, or Firm*—Brinks Hofer Gilson & Lione

(57) ABSTRACT

A driving device includes an electromechanical transducer that is extended and contracted by application of voltage, and a support member that slidably supports a movable body and that is displaced together with the electromechanical transducer to which the support member is connected, the movable body being driven along the support member with the extension and contraction of the electromechanical transducer. The movable body has a main element, a pinch member that is assembled on the main element so as to pinch and hold the support member, and a biasing member that biases the pinch member toward the support member. A part of the pinch member abuts on the support member and other part thereof is held on the main element in a cross section perpendicular to a movement direction of the movable body when the pinch member is biased by the biasing member.

10 Claims, 7 Drawing Sheets

DRIVING DEVICE

RELATED APPLICATION

This application is based on Japanese Patent Applications No. 2005-96917 and 2006-28678, the contents of which are incorporated herein by reference.

BACKGROUND OF THE INVENTION

The present invention relates to a driving device in which an electromechanical transducer is used and relates to a driving device which is suitable for drive of lenses of a camera, precision drive of an X-Y table, and the like, for example.

Figure 1:
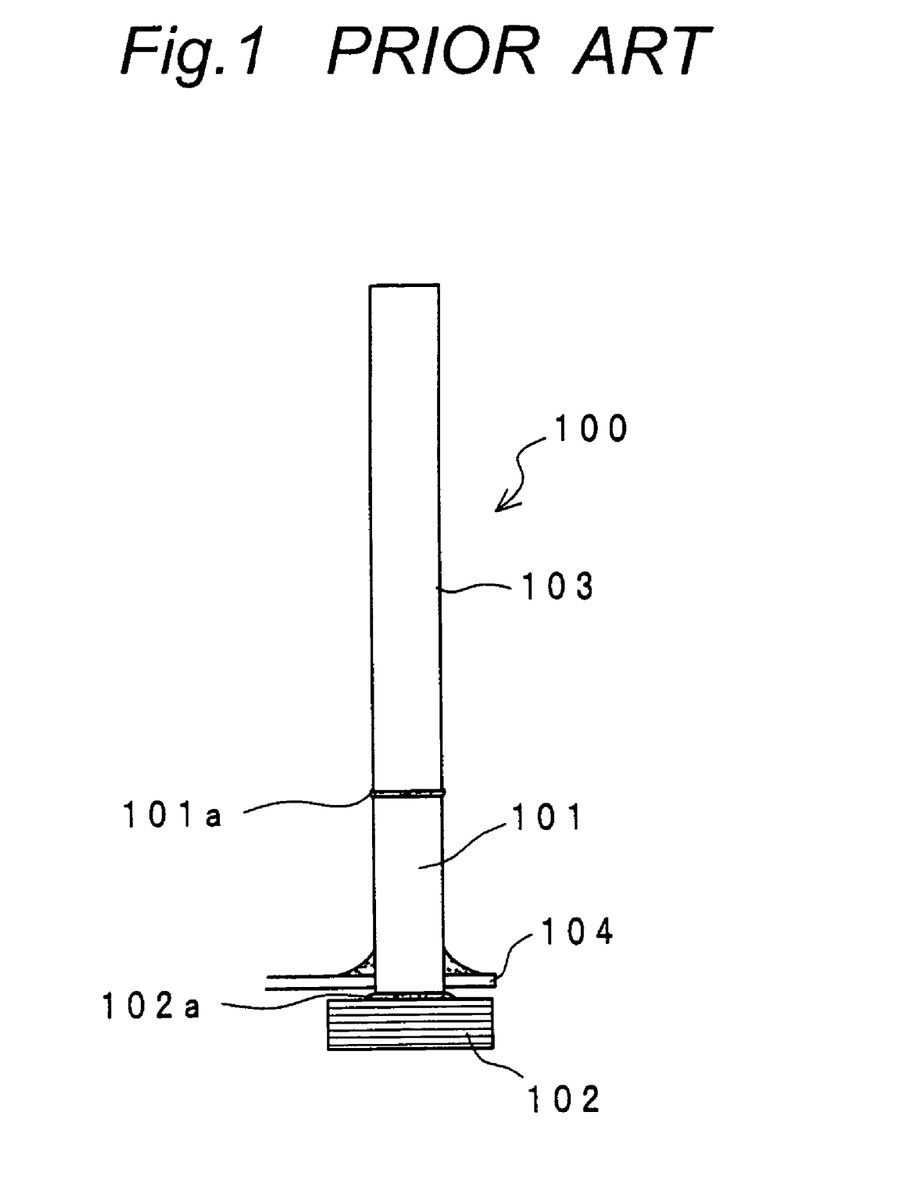
FIG. 1 is a side view of a conventional driving device.
Figure 2:
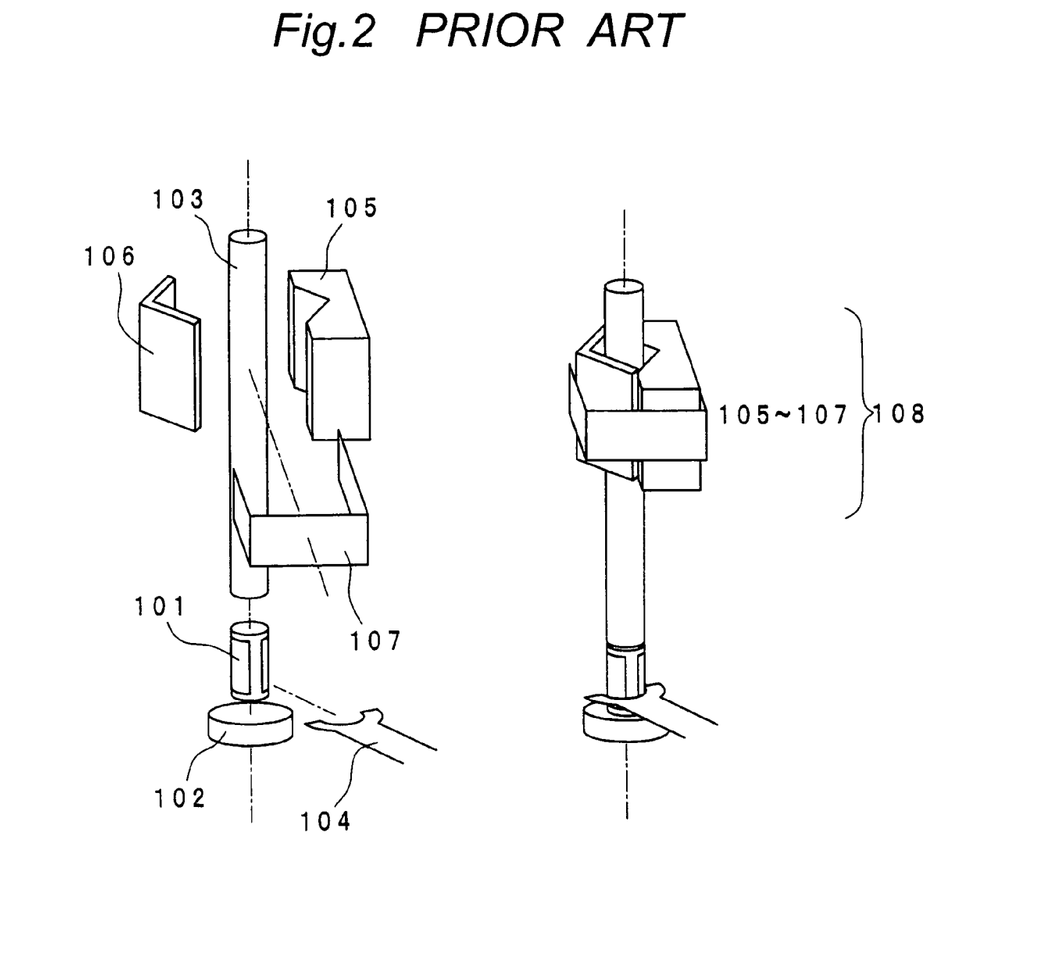
FIG. 2 are an exploded perspective view and an assembly drawing of the driving device of FIG. 1 that includes a movable body.

Conventionally, there has been known a driving device in which a movable body is moved with utilization of extension and contraction of a piezoelectric element that is an electromechanical transducer. FIG. 1 and FIG. 2 show an example of linear-type driving device. In a driving device 100 shown in FIG. 1, one end of a piezoelectric element 101 with respect to a direction of extension and contraction is fixed to an end surface of a fixed body 102 with adhesive 102a, and a driving rod 103 as a support member for a movable body is fixed to the other end of the element 101 with adhesive 101a. A feeder member 104 is connected to the piezoelectric element 101 with conductive adhesive, and specified pulse voltage is thereby applied to the piezoelectric element 101.

As shown in FIG. 2, a movable body 108 is designed to be slidable along the driving rod 103. The movable body 108 is composed of a slider 105 which is a main element of the movable body 108, a pinch member 106 for pinching and holding the driving rod 103 with the slider 105, and a leaf spring 107 for pressing the pinch member 106 toward the slider 105 with interposition of the driving rod 103. Optical members such as lenses, for example, are mounted to the slider 105 so that the optical members are linearly driven by movement of the movable body 108 on the driving rod 103.

Figure 3A:
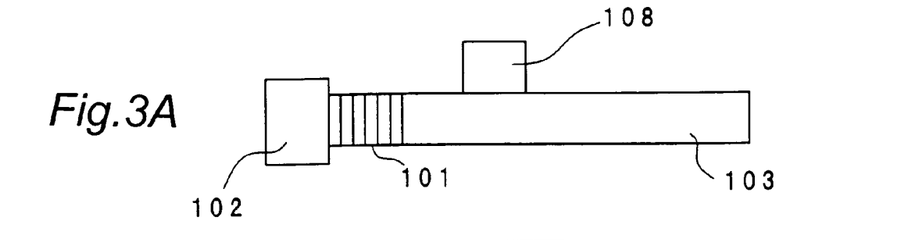
FIGS. 3A-3D are diagrams for illustrating a principle of drive of the driving device.
Figure 3B:
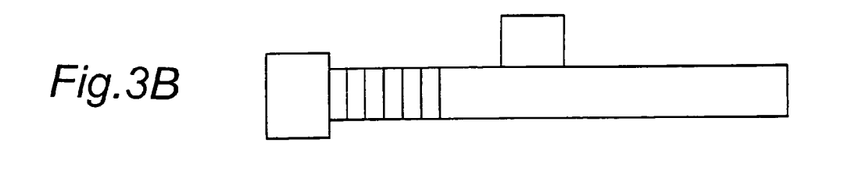
Figure 3C:
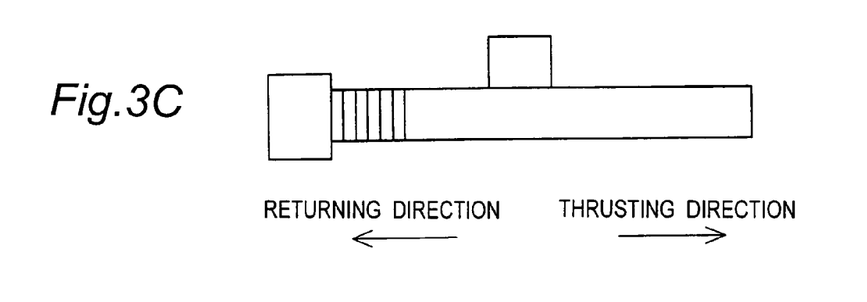
Figure 3D:
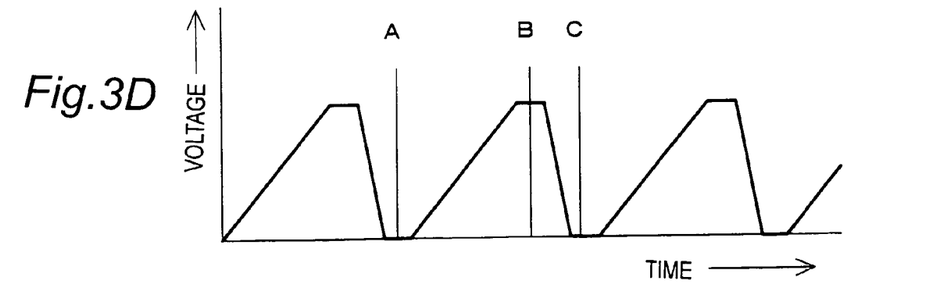

FIGS. 3A-3D show a principle of driving in the driving device 100. Pulse voltage having a sawtoothed waveform of mildly rising sections (between A and B) and steep falling sections (between B and C) as shown in FIG. 3D, for example, is applied to the piezoelectric element 101 of the driving device 100. In the mildly rising sections (between A and B) of the pulse voltage, the piezoelectric element 101 undergoes slow elongation displacement in a direction of thickness thereof as shown in FIG. 3B, and the driving rod 103 fixed to piezoelectric element 101 moves in a thrusting direction. Concomitantly, the movable body 108 engaged frictionally with the driving rod 103 moves together with the driving rod 103.

In the steep falling sections (between B and C) of the pulse voltage, the piezoelectric element 101 undergoes rapid contraction displacement in the direction of thickness thereof, and the driving rod 103 fixed to piezoelectric element 101 is displaced rapidly in a returning direction. On this occasion, as shown in FIG. 3C, an inertial force of the movable body 108 overcomes the frictional force between the movable body 108 and the driving rod 103 and causes a slip, so that the movable body 108 substantially remains in that position without moving. As a result, the movable body 108 moves in the thrusting direction, by a difference in amount of movement between the extension and contraction of the piezoelectric element 101, from an initial state shown in FIG. 3A. With repetition of such extension and contraction of the piezoelectric element 101, the movable body 108 is driven along the driving rod 103 in the thrusting direction.

Contrarily, the movable member 108 is driven in the returning direction according to a principle opposite to that described above. That is, pulse voltage having a sawtoothed waveform composed of steep rising sections and mildly sloped falling sections is applied to the piezoelectric element 101. In the steep rising sections of the pulse voltage, the piezoelectric element 101 undergoes rapid extension displacement and the driving rod 103 fixed to piezoelectric element 101 concomitantly undergoes rapid displacement in the thrusting direction. Then an inertial force of the movable body 108 overcomes the frictional force between the movable body 108 and the driving rod 103 and causes a slip, so that the movable body 108 substantially remains in that position without moving.

In the mildly sloped falling sections of the pulse voltage, the piezoelectric element 101 undergoes slow contraction displacement, and the driving rod 103 fixed to piezoelectric element 101 concomitantly undergoes slow displacement in the returning direction. Then the movable body 108 is displaced together with the driving rod 103 in the returning direction. As a result, the movable body 108 moves in the returning direction from an initial state by a difference in amount of movement between the extension and contraction of the piezoelectric element 101. With repetition of such extension and contraction of the piezoelectric element 101, the movable body 108 is driven along the driving rod 103 in the returning direction.

Figure 4:
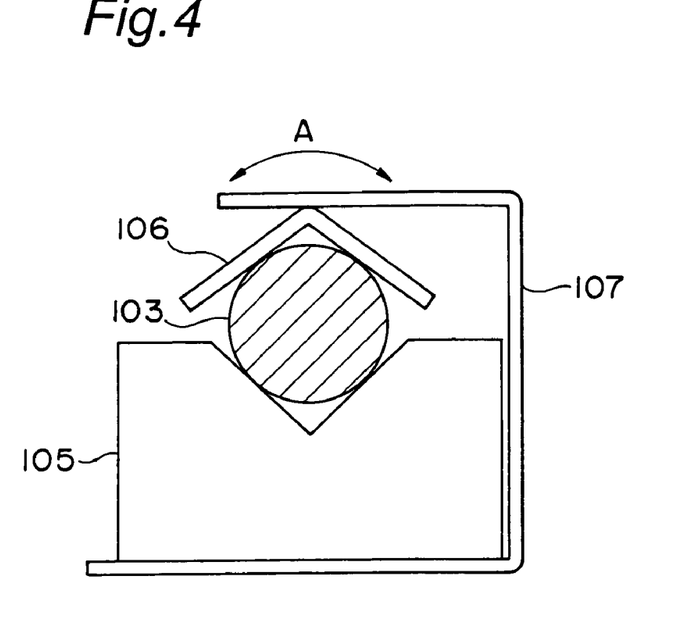
FIG. 4 is a diagram showing the movable body in the driving device of FIG. 2.

In the driving device 100, as shown in FIG. 4, the driving rod 103 is composed of a shaft member having a circular cross section, and the pinch member 106 is composed of a bent plate member having end faces shaped like a letter "V". The pinch member 106 is pressed against the driving rod 103 by the leaf spring 107 having end faces generally shaped like square brackets, and the frictional force is thereby produced between the pinch member 106 and the driving rod 103, and between the slider 105 and the driving rod 103.

In a cross section perpendicular to a movement direction of the movable body 108, a position of the pinch member 106, however, is not restricted with respect to directions along a circumferential surface of the driving rod 103 (shown by an arrow A), and therefore a condition of contact between the pinch member 106 and the driving rod 103 is made unstable in a state in which the movable body 108 is mounted on the driving rod 103. As a result, a variation is caused in the frictional force between the pinch member 106 and the driving rod 103, and between the slider 105 and the driving rod 103, among a plurality of driving devices having the same configuration. For that reason, it is essential and thus troublesome to inspect whether the frictional force for the movable body 108 is within a desired range with regard to each driving device 100 after the each driving device 100 is assembled.

In the driving device 100, the pinch member 106 is pressed against the driving rod 103 by the leaf spring 107. The leaf spring 107, however, is generally a biasing member having a large spring constant and causes the frictional force to enormously vary according to minute error of mounting, thus making a cause of large variation in driving force and driving velocity among a plurality of driving devices 100.

When the leaf spring 107 bent into the shape generally like the square bracket is mounted, the spring is expanded opposite to a direction in which the spring biases. Accordingly, the leaf spring 107 may sometimes be expanded beyond a yield point of the leaf spring 107 so that the spring constant may be changed.

The leaf spring 107 is produced with use of a press die. Therefore, a change of design of the leaf spring 107 requires adjustment of the die and thus results in cost increase.

Besides, the leaf spring 107 that causes the frictional force equal to a designed value is difficult to produce with only one trial and often requires several trials.

Figure 5:
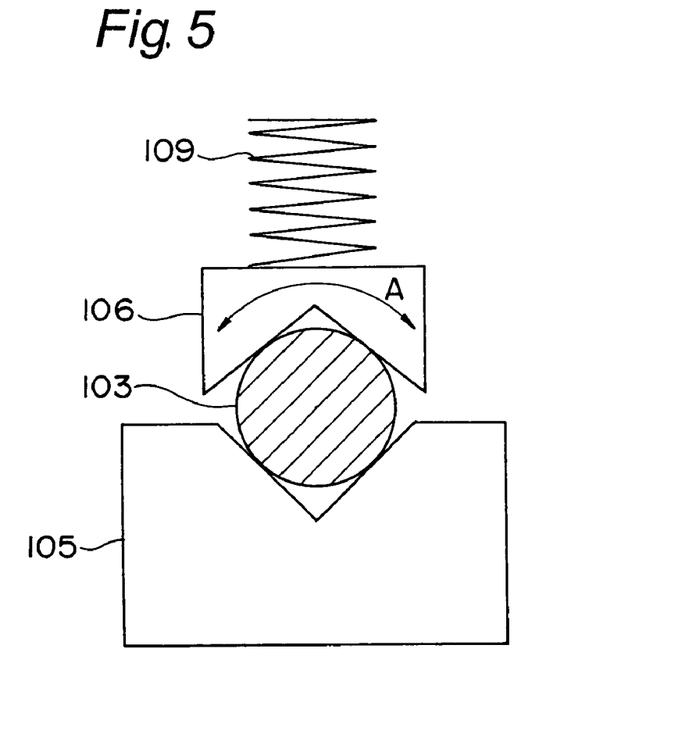
FIG. 5 is a diagram showing an example in which a frictional force for the movable body is produced by a coiled spring.

In JP H08-70586 A, as shown in FIG. 5, a driving device is disclosed in which a pinch member 106 is pressed from right above by a coiled spring 109. In this device also, however, a position of the pinch member 106 is not restricted with respect to directions shown by an arrow A, and the problem of variation in frictional force is caused as described above.

SUMMARY OF THE INVENTION

A prime object of the present invention is to provide a driving device that prevents a variation in frictional force among driving devices. A further object of the present invention is to provide a driving device that uses a biasing member more inexpensive than leaf spring.

In order to effect the object, the invention provides a driving device including an electromechanical transducer that is extended and contracted by application thereto of voltage, and a support member that slidably supports a movable body and that is displaced together with the electromechanical transducer to which the support member is connected, the movable body being driven along the support member with the extension and contraction of the electromechanical transducer, wherein the movable body has a main element therefor, a pinch member that is assembled on the main element so as to pinch and hold the support member, and a biasing member that biases the pinch member toward the support member, and a part of the pinch member abuts on the support member and other part of the pinch member is held on the main element in a cross section perpendicular to a movement direction of the movable body when the pinch member is biased by the biasing member.

In the driving device of the invention, the pinch member may be a separate member which is uncoupled on the main element of the movable body and may merely abut on the main body with a biasing force of the biasing member.

In the driving device of the invention, the pinch member may be coupled on the main element of the movable body by a pin so as to be rotatable in a plane perpendicular to a movement direction of the movable member.

In the driving device of the invention, the pinch member may be held on the main element of the movable member at a position on an opposite side to a point of action of a biasing force of the biasing member with respect to the support member.

In the driving device of the invention, the pin may be mounted on the main element of the movable body at a position on an opposite side to a point of action of a biasing force of the biasing member with respect to the support member.

In the driving device of the invention, the pin may be mounted on the main element of the movable body at a position between the support member and a point of action of a biasing force of the biasing member.

In the driving device of the invention, the biasing member may be a coiled spring. In this case, the coiled spring may be a tension spring or compression spring.

In the driving device of the invention, the support member may have a substantially circular cross section perpendicular to a movement direction of the movable body.

In accordance with the driving device of the invention, the pinch member is held on the main element of the movable body when the pinch member is biased by the biasing member. Thus a state of contact between the pinch member and the support member is made generally uniform as for a plurality of driving devices, and the frictional force between the pinch member and the support member and between the main element and the support member is stabilized. As a result, a frictional-force testing process that has been executed for each driving device can be omitted, so that labor saving and cost reduction can be attained.

With use of the coiled spring as the biasing member that biases the pinch member with respect to the support member, various springs having different spring constants can be prepared at low cost because coiled springs can be produced without use of metal mold. Besides, coiled springs having small spring constants are easier to produce than leaf springs having the same, and can therefore reduce an influence relative to disturbance in change of tension amount or compression amount. Moreover, coiled springs can easily be designed so as to have large amounts of displacement. Therefore, a coiled spring that is designed so as to have a sufficiently large amount of displacement is prevented from being mounted beyond a yield point when being assembled.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

A driving device that is the embodiment of the invention has the same configuration as the driving device 100 of the conventional example shown in FIG. 1 has, except a configuration of a movable body. In the driving device of the embodiment, that is, one end of a piezoelectric element 101 with respect to a direction of extension and contraction is fixed to an end surface of a fixed body 102 with adhesive 102a, and a driving rod 103 is fixed to the other end of the piezoelectric element 101 with adhesive 101a. A feeder member 104 is connected to the piezoelectric element 101 with conductive adhesive, and specified pulse voltage is thereby applied to the piezoelectric element 101.

The driving rod 103 is composed of a shaft member having a circular cross section which is perpendicular to movement directions of a movable body described below, for example. The driving rod 103, however, is not limited thereto and may be composed of a shaft member having an elliptic cross section, for example, or a shaft member having a polygonal cross section, for example.

Figure 6:
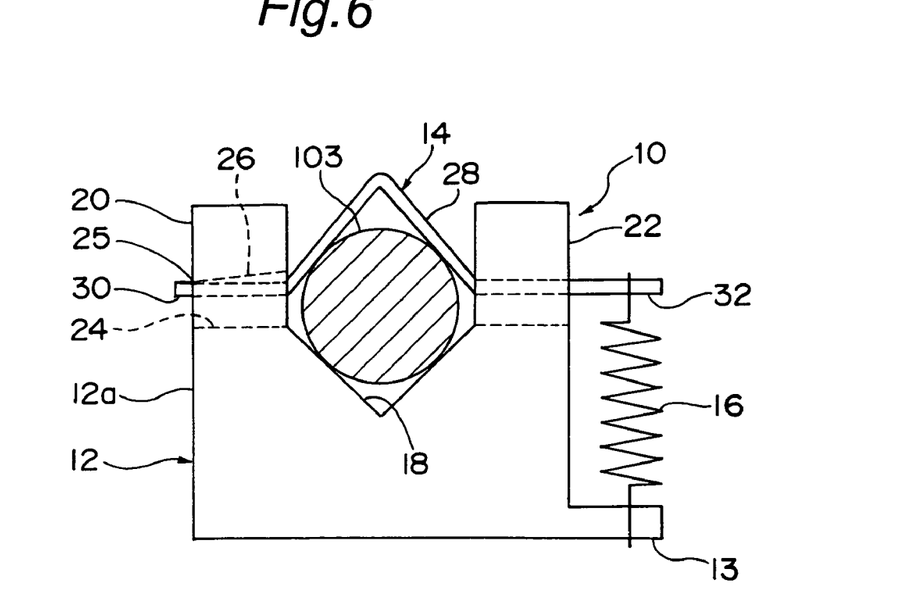
FIG. 6 is a side view of a movable body in a driving device that is an embodiment of the invention.

FIG. 6 shows a movable body 10 of the driving device of the embodiment. The movable body 10 that is supported on the driving rod 103 is engaged thereon by a predetermined frictional force and is movable along the driving rod 103. The movable body 10 has a slider 12 as a main element of the movable body 10, a pinch member 14 that are assembled onto the slider 12 so as to pinch and hold the driving rod 103, and a coiled tension spring 16 as a biasing member for biasing the pinch member 14 toward the driving rod 103. A lens frame (not shown) that supports optical members such as lenses is connected to the movable body 10, and the optical members are linearly driven by movement of the movable body 10 on the driving rod 103.

The biasing member for biasing the pinch member 14 toward the driving rod 103 is not limited to the coiled spring but may be other elastic member such as rubber.

On the slider 12 are formed a wedge-shaped recess 18 that is in contact with the driving rod 103 at two sites and standing wall portions 20, 22 that project on both sides of the recess 18. A through hole 24 is formed in the standing wall portion 20 so as to define rectangular openings on both sides of the wall portion 20. An upper inside surface 26 of the through hole 24 is formed as a slanting surface that slants slightly upward from a side surface 12a of the slider 12 toward the recess 18. On the other hand, the standing wall portion 22 is composed of two standing wall portions provided with a spacing slightly larger than a width of the pinch member 14. From the slider 12 is protruded a hook portion 13 on which one end of the coiled tension spring 16 is hooked.

The pinch member 14 is composed of a bent portion 28 that is bent so as to have end faces shaped like a letter "V" and of end portions 30, 32 that extend on both sides from both ends of the bent portion 28 on one straight line or in parallel. One end portion 30 of the pinch member 14 is inserted into the through hole 24 formed in the slider 12, and the other end portion 32 which is disposed between two standing wall portions composing the standing wall portion 22 and on which the other end of the coiled tension spring 16 is hooked serves as a point of action on which a tensility acts.

The pinch member 14 of which the other end portion 32 is pulled by the coiled tension spring 16 is biased so as to be brought into pressure contact with the driving rod 103 at two sites on an inside surface of the bent portion 28 in a cross section perpendicular to the movement direction of the movable body 10. In this state, the end portion 30 of the pinch member 14 is held by an upper edge 25 of the rectangular opening of the through hole 24 that opens on the side surface 12a of the slider 12. Herein, the term "held" signifies a state where the pinch member 14 is maintained merely in contact with the upper edge 25 of the rectangular opening of the through hole 24 formed on the slider 12, and does not signify a state where the pinch member is coupled onto the slider 12. Thus a relative position of the pinch member 14 with respect to the driving rod 103 is uniformly defined, so that a state of contact between the pinch member 14 and the driving rod 103 is made generally uniform as for a plurality of driving devices. That is, the upper edge 25 of the rectangular opening of the through hole 24 makes a fulcrum that defines the relative position between the pinch member 14 and the driving rod 103.

A principle of drive of the driving device 10 having above configuration in accordance with the embodiment is the same as that of the driving device 100 of the conventional example described above, and duplicate description thereof will be omitted.

In the driving device of the embodiment, a part of the pinch member 14 is in contact with the slider 12 so that the contact point functions as the fulcrum that defines the relative position between the pinch member 14 and the driving rod 103. The state of contact between the pinch member 14 and the driving rod 103 is thereby made generally uniform as for a plurality of driving devices. Accordingly, the frictional force between the pinch member 14 and the driving rod 103 and between the slider 12 and the driving rod 103 is stabilized. As a result, a frictional-force testing process that has been executed for each driving device can be omitted, so that labor saving and cost reduction can be attained.

In the driving device of the embodiment, a biasing member that biases the pinch member 14 with respect to the driving rod 103 is the coiled spring 16. The coiled spring 16 can be produced without use of metal mold, and thus various springs having different spring constants can be provided at low cost. Besides, the coiled spring 16 having small spring constant is easier to produce than leaf springs having the same, and can therefore reduces an influence relative to disturbance in change of tension amount (or compression amount). Moreover, the coiled spring 16 can easily be designed so as to have a large amount of displacement. Therefore, the coiled spring 16 that is designed so as to have a sufficiently large amount of displacement is prevented from being mounted beyond a yield point when being assembled.

Figure 7:
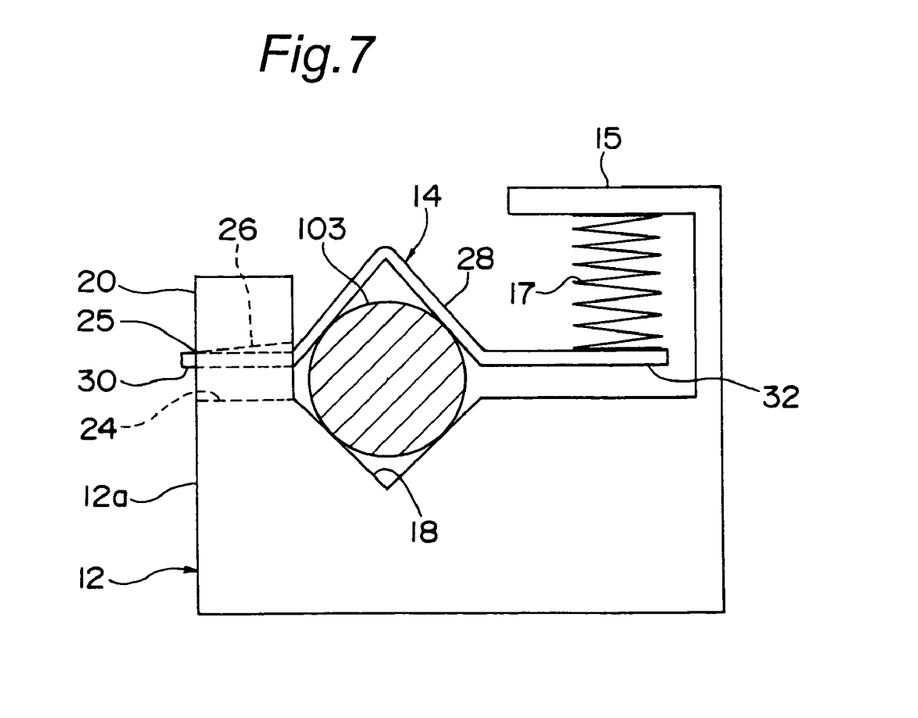
FIG. 7 is a diagram showing a modification of the movable body.

Though a biasing force exerted on the pinch member 14 toward the driving rod 103 is given by the coiled tension spring 16 in the driving device of the embodiment, the pinch member 14 may be biased by a coiled compression spring 17 that is placed between a spring supporting portion 15 provided on the slider 12 and the other end portion 32 of the pinch member 14, as shown in FIG. 7.

In the driving device of the embodiment, the upper inside surface 26 of the through hole 24 is formed as a slanting surface that slants slightly upward from a side surface 12a of the slider 12 toward the recess 18. The fulcrum, however, can be configured on condition that the upper inside surface 26 is formed as a slanting surface that slants slightly downward from a side surface 12a of the slider 12 toward the recess 18 or on condition that the upper inside surface 26 has no slant. That is, in the case where the upper inside surface 26 is formed as a slanting surface that slants slightly downward from a side surface 12a of the slider 12 toward the recess 18, an upper edge of the rectangular opening of the through hole 24 that opens on the recess 18 side serves as the fulcrum for holding the pinch member 14. Alternatively, the upper inside surface 26 includes a protrusion that is inwardly protruded at a middle position between the side surface 12a and the recess 18 of the slider 12, the protrusion may serve as the fulcrum by abutting the end portion 30 of the pinch member 14 thereon.

Figure 8:
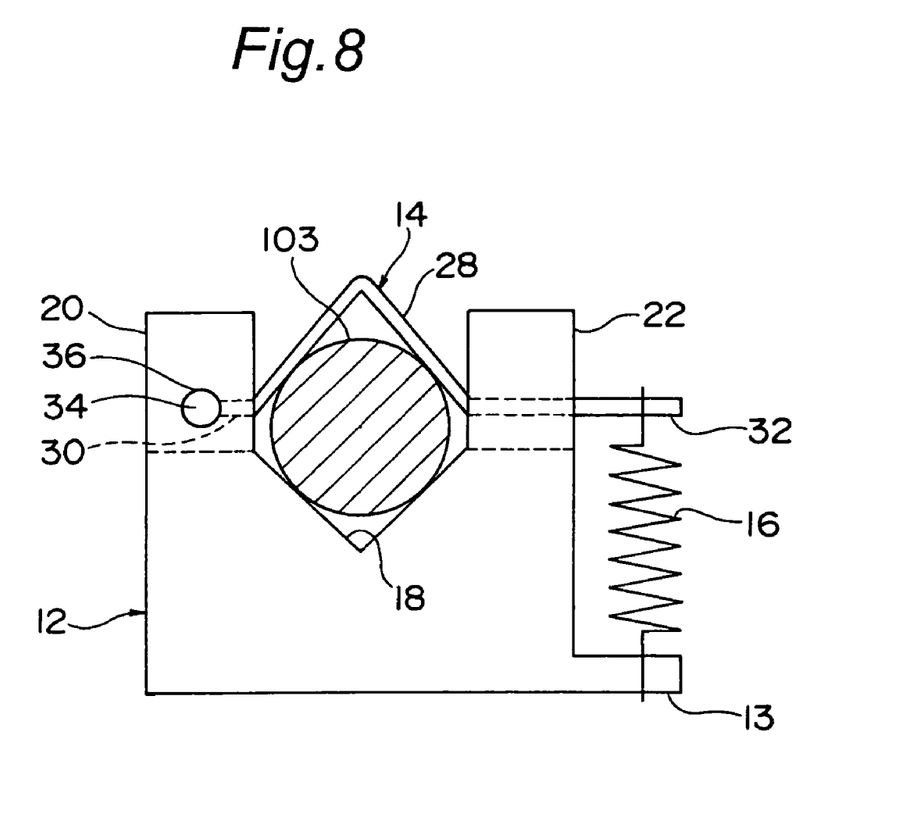
FIG. 8 is a diagram showing other modification of the movable body.

Moreover, a configuration of the fulcrum is not limited to that with use of the through hole 24 and may be modified variously. As shown in FIG. 8, for example, a pin 34 shaped like a round bar may be connected to one end portion 30 of the pinch member 14, the standing wall portion 20 of the slider 12 may be formed as two standing wall portions provided with a spacing slightly larger than the width of the pinch member 14, and apertures 36 that pivotably support both ends of the pin 34 may be formed in the two standing wall portions. In this configuration, the pinch member 14 is held and coupled on the slider 12 through the pin 34 inserted in the apertures 36 so as to be rotatable in a plan perpendicular to the movement direction of the movable body 10, and the apertures 36 serve as the fulcrum.

Figure 9:
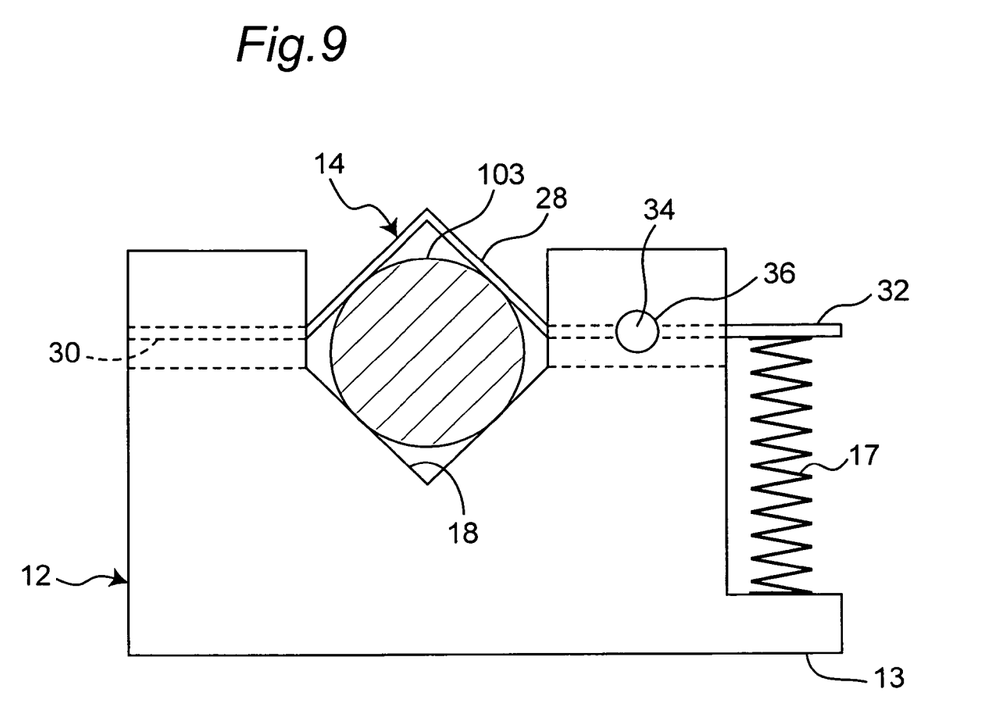
FIG. 9 is a diagram showing yet other modification of the movable body.

Furthermore, in the driving device of the embodiments, a position of the fulcrum and the pin is set on an opposite side to the action point of the biasing force of the biasing member with respect to the driving rod 103. The position of the fulcrum and the pin, however, may be set on the same side to the action point of biasing force with respect to the driving rod 103. FIG. 9 shows an example in which the pin 34 for rotatably supporting the pinch member 14 is provided between the action point of the biasing force and the driving rod 103. In this example, the coiled compression spring is used as the biasing member, and the pinch member 14 can downwardly press the driving rod 103 by the other end portion 32 as the action point being upwardly biased with the coiled compression spring 17. In this case, one end portion 30 of the pinch member 14 may be omitted.

In a principle of drive of the driving device, the movable body 10 can be most effectively moved relative to the driving rod 103 when the slow motion of the driving rod 103 results in moving the movable body 10 together with the driving rod 103, whereas the quick motion of the driving rod 103 results in staying the movable body 10 by the slide thereof on the driving rod 103. The present invention, however, is not limited to such condition. That is, the movable body 10 can be moved relative to the driving rod 103 when the sliding lengths of the movable body 10 are different from each other between the occasion of the slow motion of the driving rod 103 and the occasion of the quick motion thereof even if the slow motion of the driving rod 103 results in slightly sliding the movable body 10 relative to the driving rod 103 and the quick motion of the driving rod 103 results in not staying but sliding the movable body 10 relative to the driving rod 103.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving device comprising:
   an electromechanical transducer that is extended and contracted by application thereto of voltage, and
   a support member that slidably supports a movable body and that is displaced together with the electromechanical transducer to which the support member is connected, the movable body being driven along the support member with the extension and contraction of the electromechanical transducer, wherein
   the movable body has a main element therefor;
   a pinch member that is assembled on the main element and configured to pinch and hold the support member;
   the pinch member having a first end configured to be biased by a biasing member that biases the pinch member toward the support member;
   the pinch member having a second end configured to abut and pivot relative to the main element based on a biasing force applied by the biasing member; and
   wherein the pinch member is held on the main element in a cross section perpendicular to a movement direction of the movable body when the pinch member is biased by the biasing member.

2. A driving device as claimed in claim 1, wherein the pinch member as a separate member which is uncoupled on the main element of the movable body merely abuts on the main body with a biasing force of the biasing member.

3. A driving device as claimed in claim 1, wherein the pinch member is coupled on the main element of the movable body by a pin so as to be rotatable in a plane perpendicular to a movement direction of the movable member.

4. A driving device as claimed in claim 1, wherein the pinch member is held on the main element of the movable member at a position on an opposite side to a point of action of a biasing force of the biasing member with respect to the support member.

5. A driving device as claimed in claim 1, wherein a pin is mounted on the main element of the movable body at a position on an opposite side to a point of action of a biasing force of the biasing member with respect to the support member.

6. A driving device as claimed in claim 5, wherein the pin is mounted on the main element of the movable body at a position between the support member and a point of action of a biasing force of the biasing member.

7. A driving device as claimed in claim 1, wherein the biasing member is a coiled spring.

8. A driving device as claimed in claim 7, wherein the coiled spring is a tension spring.

9. A driving device as claimed in claim 7, wherein the coiled spring is a compression spring.

10. A driving device as claimed in claim 1, wherein the support member has a substantially circular cross section perpendicular to a movement direction of the movable body.

* * * * *